United States Patent
Watson et al.

(10) Patent No.: US 7,551,380 B2
(45) Date of Patent: Jun. 23, 2009

(54) METHOD FOR WRITING A SERVO PATTERN IN TAPE

(75) Inventors: Mark Lee Watson, Louisville, CO (US); Steven Gregory Trabert, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/861,960

(22) Filed: Sep. 26, 2007

(65) Prior Publication Data

US 2009/0080108 A1 Mar. 26, 2009

(51) Int. Cl.
G11B 5/02 (2006.01)
G11B 5/09 (2006.01)
(52) U.S. Cl. .......................................... 360/55; 360/48
(58) Field of Classification Search ................... None
See application file for complete search history.

(56) References Cited

U.S. PATENT DOCUMENTS 6,282,051 B1 * 8/2001 Albrecht et al. .............. 360/75
6,970,312 B2 * 11/2005 Yip et al. .................... 360/48
7,265,924 B2 * 9/2007 Shirouzu .................... 360/64
7,280,299 B2 * 10/2007 Takano et al. ............... 360/66

OTHER PUBLICATIONS

T. Inoue, et al., Playback Performance Of Ultrahigh-Capacity Tape Media With Nanosized Composite Advanced Particle (NanoCAP), IEEE Transactions On Magnetics, vol. 42, No. 3, Mar. 2006, pp. 465-467.
Takeshi Nagata, t al., A Recording Density Study Of Advanced Barium-Ferrite Particulate Tape, IEEE Transactions On Magnetics, vol. 42, No. 10, Oct. 2006, pp. 2312-2314.
Kazunari Motohashi, et al., Investigation Of Higher Recording Density Using An Improved Co-CoO Metal Evaporated Tape With A GMR Reproducing Head, IEEE Transactions On Magnetics, vol. 43, No. 6, Jun. 2007, pp. 2325-2327.

* cited by examiner

Primary Examiner—K. Wong
(74) Attorney, Agent, or Firm—Brooks Kushman P.C.

(57) ABSTRACT

A tape has a component of magnetization pointing out of a plane of the tape. To write a pulse of a servo pattern to the tape, the tape is passed over a write head with a conventional write gap. Current having a fixed polarity is provided to the write head. Once the current achieves a desired value, the current is no longer provided to the write head.

20 Claims, 5 Drawing Sheets

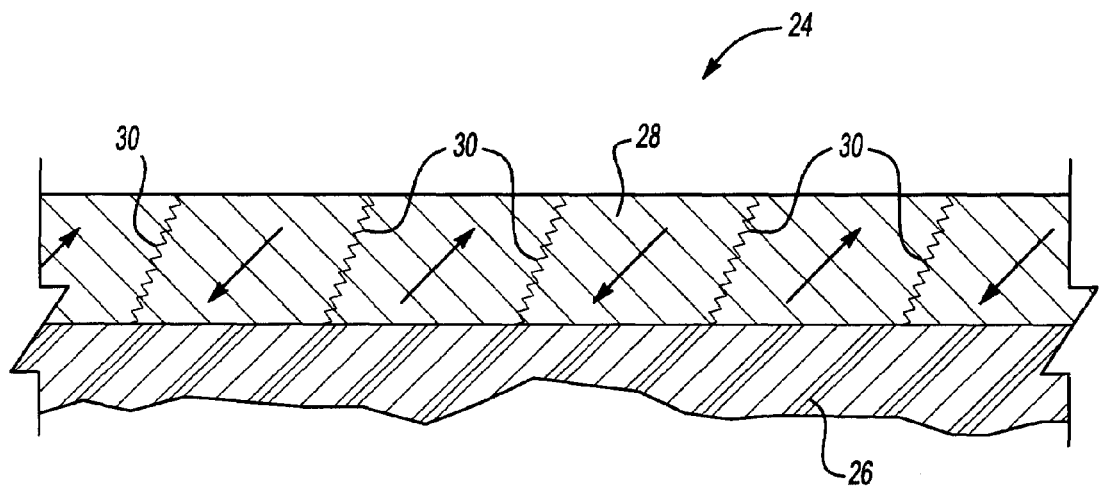
Fig-10
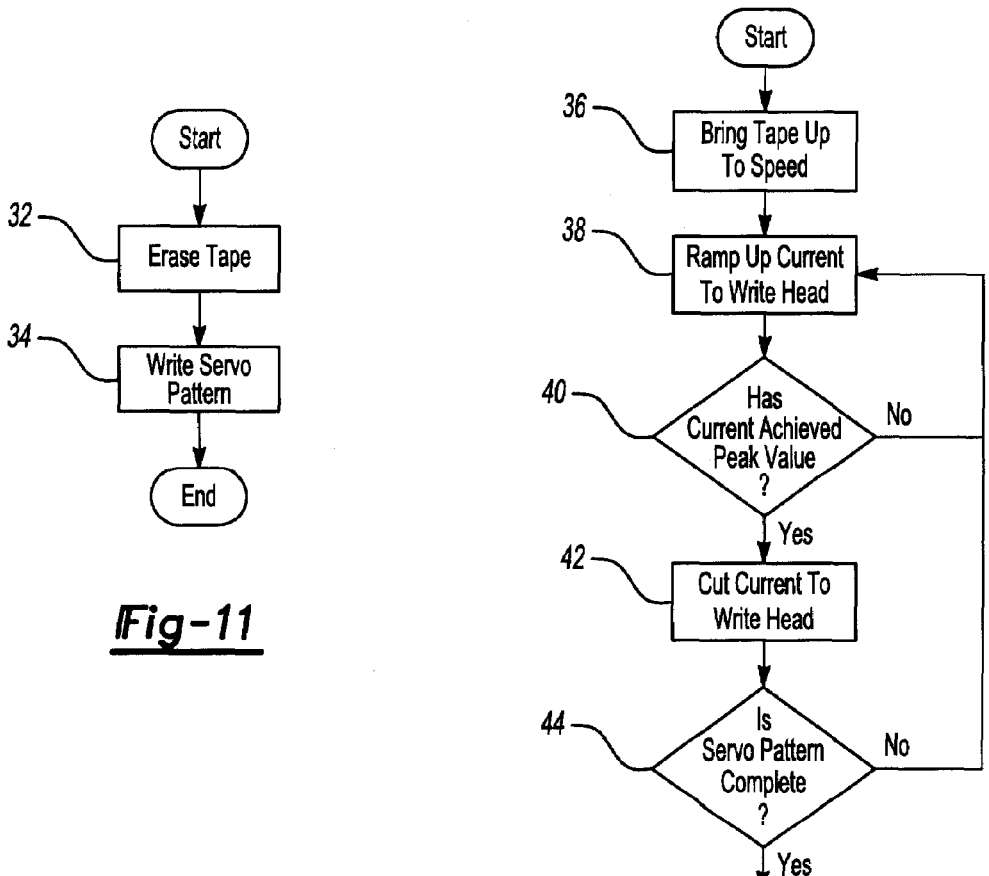
Fig-11
Fig-12

METHOD FOR WRITING A SERVO PATTERN IN TAPE

BACKGROUND

1. Field of the Invention

The invention relates to methods for writing servo patterns in tapes.

2. Discussion

Some recording tapes include a thin layer, e.g., <150 nm, containing small, e.g., <60 nm, acicular magnetic metal particles. The particles are coated onto a plastic base film typically using a slightly thicker under layer to smooth the intrinsic roughness of the base film material. The particles in this type of media typically have a packing fraction of about 40%-60%. Tape manufacturers attempt to align the particles along a longitudinal tape direction when coating the tape. This results in a tape which has an in-plane magnetic moment and noise properties that are largely dictated by particle size, particle distribution, coating uniformity, and surface roughness.

The read back pulse width, pulse shape, and intrinsic signal to noise ratio of prerecorded servo patterns written in these tapes are limited by the tape's intrinsic recording characteristics. An example of such a servo read back signal is shown in FIG. 1. An enlarged portion of a pair of pulses of this signal is shown in FIG. 2. Timing based servo control systems use the timing and position of the peaks of the read back signal to determine the position of the head relative to the prerecorded servo pattern.

Other recording tapes include different types of particles, e.g., barium-ferrite or iron nitride, and coatings, e.g., advanced metal evaporated or sputtered. The use of these particles and coatings may increase linear density because the magnetic transitions between bits of data written as regions of opposite magnetic polarity are much narrower than those in metal particle tape. Due to the nature of these types of coatings, however, conventional methods used to write pre-recorded servo patterns produce large baseline offsets between the written transitions as well as marked asymmetry in the pulse shapes as shown in FIG. 3. An enlarged portion of a pair of pulses of this signal is shown in FIG. 4.

SUMMARY

A tape having a reduced in-plane or perpendicular anisotropy may be moved over a write head. A series of consecutive servo pulses are written by, for each servo pulse in the series, turning on a current to the write head to magnetize a region of the magnetic coating of the tape and turning off the current. The currents each have the same fixed polarity.

A tape having a magnetic coating and a component of magnetic moment generally perpendicular to a plane of the tape may be passed over a write head. A pulse of current having a constant direction is provided to the write head to magnetize a region of the magnetic coating of the tape to write a pulse of a servo pattern in the tape.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 10 is enlarged side view, in cross-section, of a portion of an advanced media recording tape.

FIG. 11 is a flow chart of a method for writing a servo pattern in a tape according to certain embodiments of the invention.

FIG. 12 is another flow chart of a method for writing a servo pattern in a tape according to certain embodiments of the invention.

DETAILED DESCRIPTION

Increased data rates and cartridge capacity are desirable in tape drives. Increases in cartridge capacity may be achieved by increasing the linear data density and the number of data tracks written across the width of the tape. Increasing both of these, however, presents several technical issues.

As an example, the maximum achievable linear density is currently limited by the intrinsic media properties. Increases in linear density may be made through improvements in the media properties. For example, it has been reported that an advanced barium-ferrite particulate tape with a smooth surface, thin magnetic layer and finely dispersed particles yields a signal to noise ratio of 23.5 dB at 200 kfci and a read back pulse width of 172 nm. Such a tape was estimated to be capable of achieving a recording density of 7 Gb/in$^2$ with an EPR4 channel.

As another example, the ability to actively and accurately position the recording head relative to the recorded tracks on the tape requires the head position relative to the tape to be identified. This may be accomplished by the recording head reading pre-recorded servo patterns on the tape. As explained below, however, conventional methods for writing servo patterns in advanced media are ineffective.

Techniques described herein address issues associated with writing accurate servo patterns in advanced media and improves the quality of the servo patterns in these media. These improvements may enable accurate track following in future tape drive systems.

A method for writing servo patterns in magnetic recording tape having an out-of-plane magnetic moment is described. Such servo patterns enable the accurate positioning of a recording head relative to the tape using a suitable head actuator assembly and servo control system. Narrow transitions can be achieved in tape having, for example, a magnetic moment perpendicular to the plane of the tape by writing short field pulses. These pulses may be produced by a servo write head.

Figure 5:
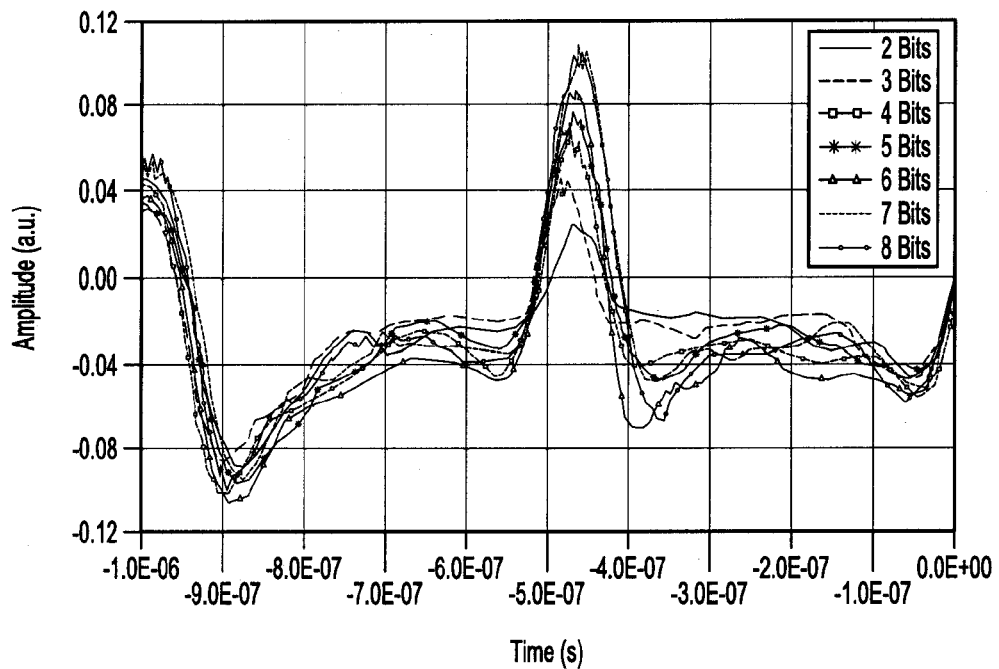
FIG. 5 is an exemplary plot of a read-back waveform of transitions written in advanced media with a perpendicular anisotropy using conventional (left of figure) and pulsed field techniques (center of figure).

FIG. 5 shows, at the left, read back waveforms from transitions written using a conventional writing method, e.g., no return on zero (NRZ), and a conventional write head. In the NRZ writing method, a digital one is encoded in one direction of magnetization and a digital zero is encoded in the opposite direction of magnetization. FIG. 5 also shows, at the center, read back waveforms from transitions written using the pulsed field technique. The transitions were written using a conventional write head with a narrow write gap. The width of the pulse used to write the transition at the center of FIG. 5 was increased. The combination of the head's write field gradient and the tape's intrinsic magnetization results in extremely narrow written transitions with commensurately narrow read back pulses. It is further possible to optimize the read back pulse width and amplitude, for a given tape type, through design of the write head and pulse length.

Figure 6:
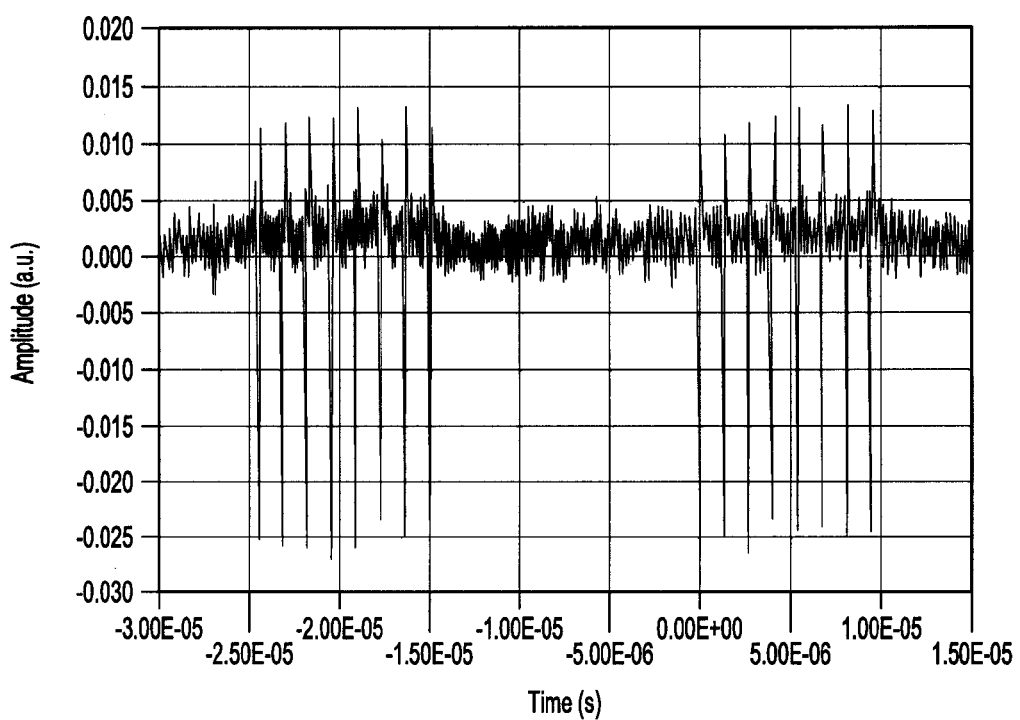
FIG. 6 is an exemplary plot of a read-back waveform from a pre-recorded servo pattern written in an advanced media with a perpendicular anisotropy using pulsed field techniques and read back using an ultra-narrow servo reader.

Servo patterns may be written in advanced media having a perpendicular anisotropy using the pulsed field technique. FIG. 6 shows two such servo bursts, each consisting of eight transitions. An ultra-narrow servo reader was used to read the pre-recorded pattern.

Figure 2:
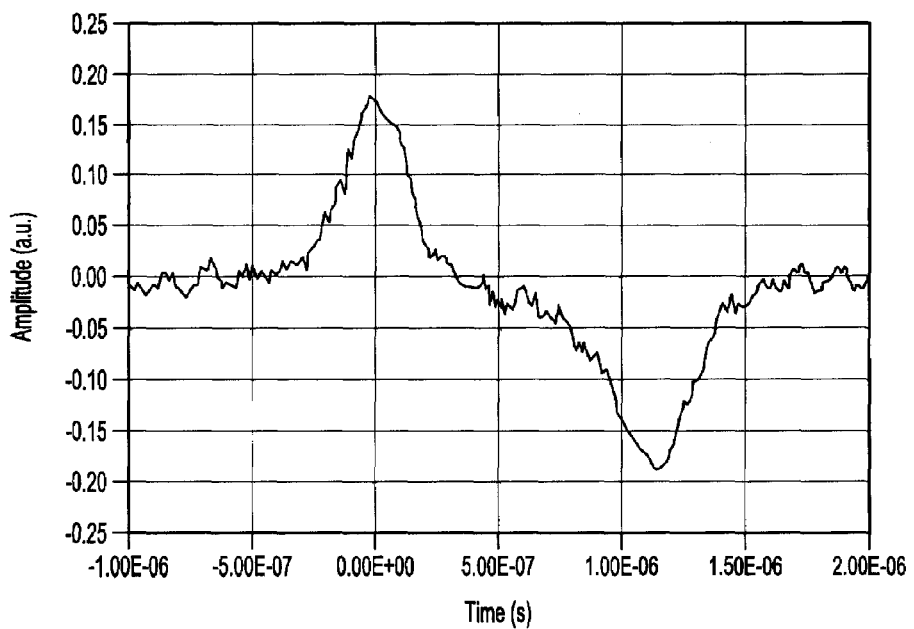
FIG. 2 is an enlarged portion of the pre-recorded servo pattern of FIG. 1.
Figure 3:
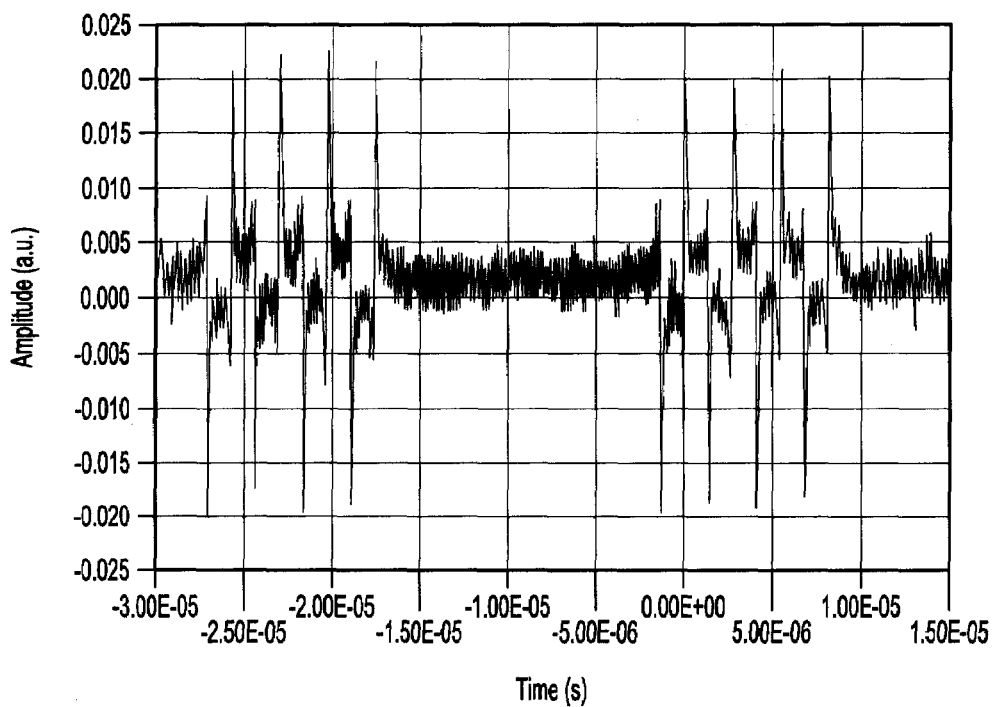
FIG. 3 is an exemplary plot of a read-back waveform from a pre-recorded servo pattern written in an advanced media with a perpendicular anisotropy using conventional techniques and read-back using an ultra-narrow servo reader.
Figure 7:
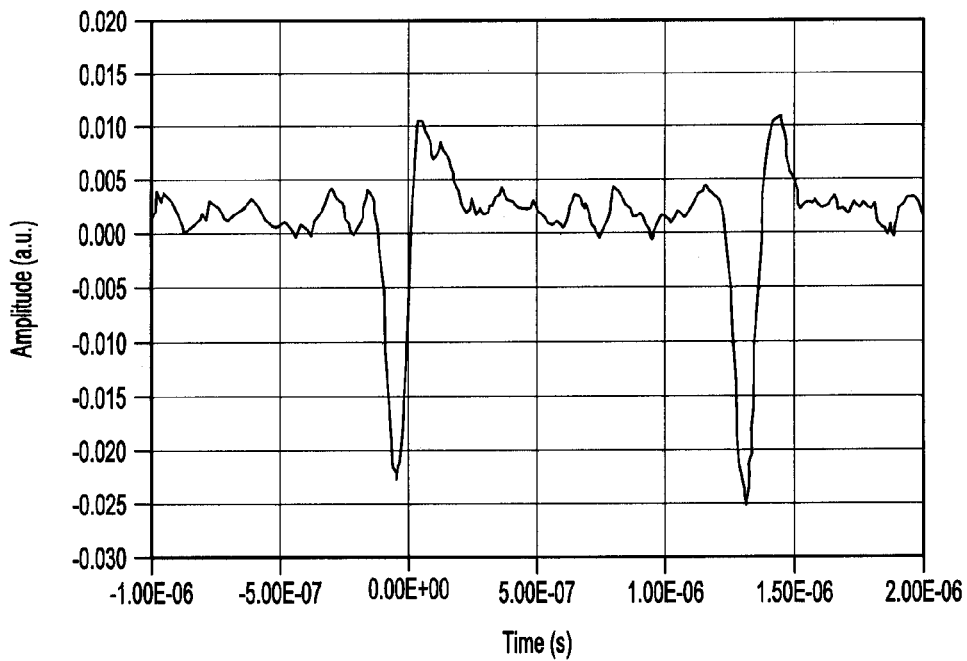
FIG. 7 is an enlarged portion of the pre-recorded servo pattern of FIG. 6.

FIG. 7 shows an enlarged portion of two of the pulses that make up one of the servo bursts shown in FIG. 6. FIGS. 2 and 7 have the same time scale. The same tape speed was used to read both servo patterns. Unlike the pair of pulses of FIG. 2, the two pulses of FIG. 7 are substantially uni-polar.

The pulsed field technique produces significantly narrower and better defined read back pulses compared to conventional methods and media. Although there is a clear asymmetry in the amplitudes, accurate servo timing data can be obtained using peaks of only one polarity, e.g., the negative going pulses.

This pulsed field technique may be extended to writing multiple independent servo bands with any azimuthal angle using a suitable servo write head similar to those currently used in the tape drive industry.

Figure 4:
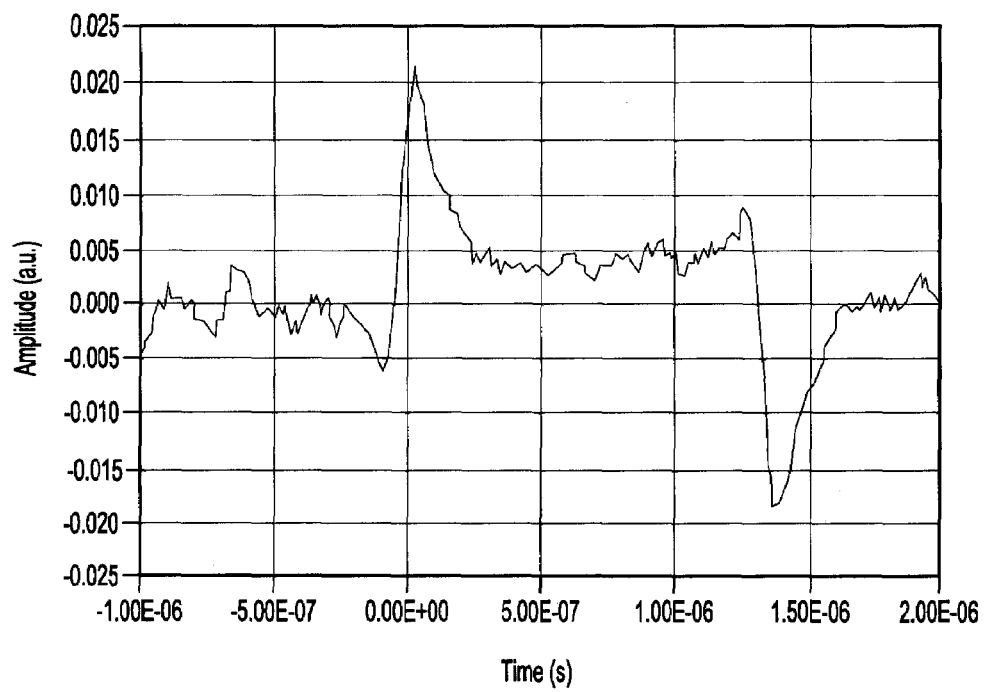
FIG. 4 is an enlarged portion of the pre-recorded servo pattern of FIG. 3.

Timing based servo patterns can be written, using a conventional narrow gap write head, in tape media with a longitudinal or in-plane anisotropy, for example, by ramping up the write current, with one polarity, to a maximum and then ramping down the write current, with an opposite polarity, to a minimum. This will produce the exemplary pair of pulses as shown in FIG. 2 which were written using a conventional writing technique. In advanced media having a reduced in-plane or out of plane anisotropy, this conventional writing technique and writer will result in highly distorted and asymmetric wave forms as shown in FIG. 4.

Figure 8:
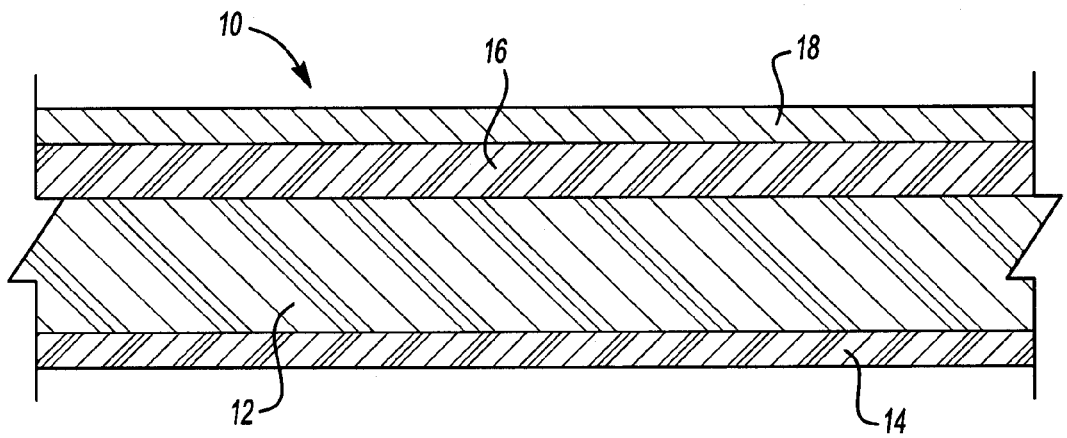
FIG. 8 is a side view, in cross-section, of an exemplary conventional recording tape.

FIG. 8 is side view, in cross-section, of a conventional recording tape 10. The recording tape 10 includes a base film 12, e.g., PET, PEN or Aramid, a back coat 14, an under layer 16, and a metal particle magnetic coating 18. The magnetic coating 18 may be manufactured by particle deposition, evaporation, sputtering, or any other known technique. The coating technique dictates the magnetic properties of the magnetic coating 18. Some of the coating techniques may be preferred to others with regard to the recording characteristics of the magnetic coating 18.

Figure 9:
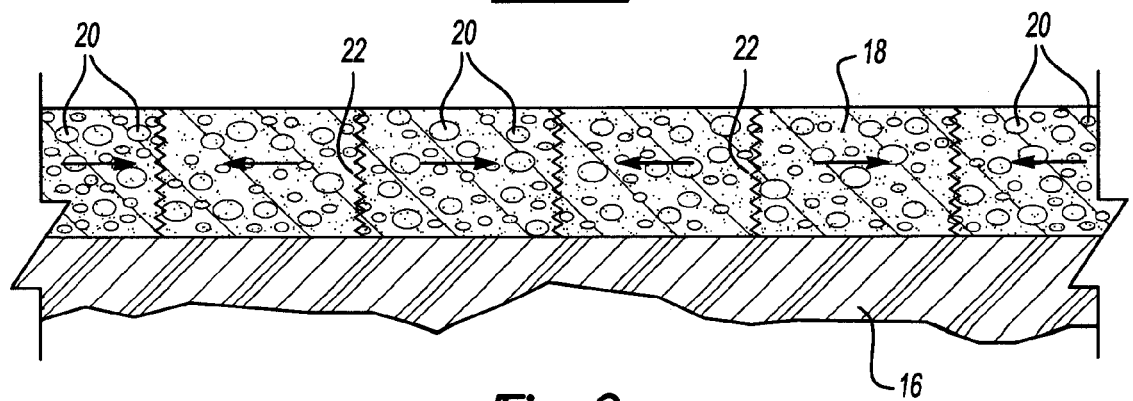
FIG. 9 is an enlarged side view, in cross-section, of a portion of the recording tape of FIG. 8.

FIG. 9 is an enlarged side view, in cross-section, of the magnetic coating 18. The magnetic coating 18 includes acicular magnetic particles 20 which have an intrinsic size distribution. Magnetic transitions 22 are written into the magnetic coating 18 using a conventional write head and conventional writing techniques. The combination of the in-plane anisotropy (as indicated by arrow) of this type of media and the recording characteristics of conventional write heads results in transitions which are out of plane at the magnetic cell boundaries. In such cases, the read back signal is produced by the magnetic fringing field at the transition edges.

The maximum linear recording density of this type of media is limited by the size of the magnetic particles 20 and the demagnetizing fields at the transitions 22. For example, if the transitions 22 are packed too tightly, they demagnetize.

Figure 1:
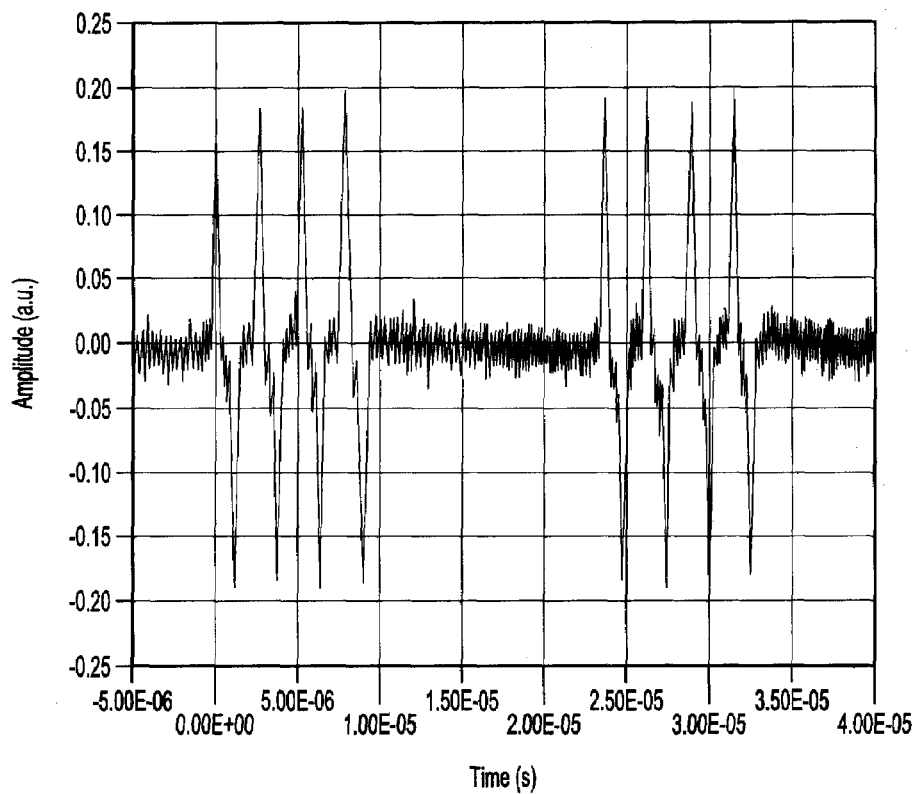
FIG. 1 is an exemplary plot of a pre-recorded servo pattern written in metal particle media and read back using a conventional servo reader.

There is no vertical component of magnetization emanating from the magnetic coating 18 in the regions between the written transition edges 22. This can also in be seen in FIG. 1 where the read back signal does not detect any perpendicular magnetization component in the regions between the written transition edges.

FIG. 10 is an enlarged side view, in cross-section, of a portion of an advanced media recording tape 24. The recording tape 24 includes an under layer 26 and magnetic coating 28 with an out-of-plane anisotropy (as indicated by arrow). The magnetic field emanates from transitions 30 and is enhanced at the junction/boundary between regions of opposite polarity rather than "fringing" as in media, such as recording tape 10 (FIGS. 8 and 9), having magnetization in the plane of the surface of the magnetic coating. Writing servo patterns using a conventional narrow gap write head in media, such as recording tape 24, with very narrow field pulses that do not swing around a zero write current results in narrow transitions with a substantial vertical field component. This substantially narrows the effective read-back pulse width and increases the amplitude of the read back pulse. As such, ultra-high linear density media formulations may be used.

FIG. 11 is a flow chart of a method for writing a servo pattern in a tape. At step 32, the tape is erased. For example, the tape may be DC erased. DC erasing magnetizes the magnetic particles in generally the same direction. The tape may also be AC erased. AC erasing magnetizes the magnetic particles in generally random directions. At step 34, the servo pattern is written. If the tape is DC erased, the polarity of the current to write the pattern may be selected to oppose the direction of magnetization of the magnetic particles.

FIG. 12 is a flow chart of a method for writing a servo pattern in an advanced media tape. At step 36, the advanced media tape is brought up to speed. For example, an advanced barium-ferrite particulate tape is brought up to a speed of at least 8 meters per second. At step 38, a current having a constant direction is permitted to flow to the write head. For example, a current having a positive polarity is permitted to flow to the write head. At step 40, it is determined whether the current has achieved a desired value. For example, it is determined whether the current has achieved a value of at least 25 milliamps. If no, the method returns to step 38. If yes, at step 42, the current is no longer permitted to flow to the write head. For example, the current is turned off. At step 44, it is determined whether the servo pattern is complete. If no, the method returns to step 38. If yes, the method ends.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for writing, with a write head, a portion of a servo pattern to a tape having a magnetic coating and a component of magnetic moment generally perpendicular to a plane of the tape, the method comprising:

moving the tape over the write head; and writing a series of consecutive, substantially uni-polar servo pulses by, for each servo pulse in the series, turning on a current to the write head to magnetize a region of the magnetic coating of the tape and turning off the current wherein the currents each have the same fixed polarity, thereby writing a portion of the servo pattern to the tape.

2. The method of claim 1 wherein the magnetic coating has magnetic particles, further comprising DC erasing the tape to magnetize the magnetic particles in a generally uniform direction.

3. The method of claim 2 wherein the polarity of the currents generally oppose the uniform direction of the magnetic particles.

4. The method of claim 1 wherein the magnetic coating has magnetic particles, further comprising AC erasing the tape to magnetize the magnetic particles in generally random directions.

5. The method of claim 1 wherein turning on the current includes ramping the current to a predetermined value.

6. The method of claim 5 wherein the current is turned off once the current achieves the predetermined value.

7. The method of claim 1 wherein each of the servo pulses is a substantially uni-polar pulse.

8. A method for writing, with a single narrow gap write head, a portion of a servo pattern in a tape having a magnetic coating and a component of magnetic moment generally perpendicular to a plane of the tape, the method comprising:
    moving the tape over the single narrow gap write head; and
    providing a series of consecutive pulses of current having the same fixed polarity to the write head to magnetize a region of the magnetic coating of the tape, thereby writing a portion of a servo pattern in the tape.

9. The method of claim 8 wherein the magnetic coating has magnetic particles, further comprising DC erasing the tape to magnetize the magnetic particles in a generally uniform direction.

10. The method of claim 9 wherein the fixed polarity of the currents generally opposes the uniform direction of the magnetic particles.

11. The method of claim 8 wherein the magnetic coating has magnetic particles, further comprising AC erasing the tape to magnetize the magnetic particles in generally random directions.

12. The method of claim 8 wherein providing a series of consecutive pulses of current includes ramping the current to a predetermined value.

13. The method of claim 12 wherein providing a series of consecutive pulses of current further includes cutting the current once the current achieves the predetermined value.

14. A method for writing a pulse of a servo pattern in a tape with a write head, the method comprising:
    passing, over the write head, a tape having a magnetic coating and a component of magnetic moment generally perpendicular to a plane of the tape; and
    providing a pulse of current having a constant direction to the write head to magnetize a region of the magnetic coating of the tape to write a pulse of a servo pattern in the tape.

15. The method of claim 14 wherein the magnetic coating has magnetic particles, further comprising DC erasing the tape to magnetize the magnetic particles in a generally uniform direction.

16. The method of claim 15 wherein the constant direction of the current generally opposes the uniform direction of the magnetic particles.

17. The method of claim 14 wherein the magnetic coating has magnetic particles, further comprising AC erasing the tape to magnetize the magnetic particles in generally random directions.

18. The method of claim 14 wherein providing a pulse of current includes ramping the current to a predetermined value.

19. The method of claim 18 wherein providing a pulse of current further includes reducing the current once the current achieves the predetermined value.

20. The method of claim 1 wherein the write head has a write gap of less than 1 micron.

* * * * *